United States Patent [19]

Chrobaczek et al.

[11] Patent Number: 5,057,572
[45] Date of Patent: Oct. 15, 1991

[54] AQUEOUS, FINELY DIVIDED TO OPTICALLY CLEAR, THERMALLY AND MECHANICALLY STABLE SILICONE EMULSIONS, A PROCESS FOR THEIR PREPARATION AND THEIR USE

[75] Inventors: Harald Chrobaczek, Augsburg; Günther Tschida, Schwabmünchen, both of Fed. Rep. of Germany

[73] Assignee: Ciba-Geigy Corporation, Ardsley, N.Y.

[21] Appl. No.: 424,244

[22] PCT Filed: Apr. 7, 1988

[86] PCT No.: PCT/EP88/00285

§ 371 Date: Oct. 16, 1989

§ 102(e) Date: Oct. 16, 1989

[87] PCT Pub. No.: WO88/08436

PCT Pub. Date: Nov. 3, 1988

[30] Foreign Application Priority Data

Apr. 24, 1987 [DE] Fed. Rep. of Germany ....... 3713789
Jul. 17, 1987 [DE] Fed. Rep. of Germany ....... 3723697

[51] Int. Cl.$^5$ ............ C08K 5/06; D06M 15/643
[52] U.S. Cl. ............ 524/588; 8/116.1; 428/266; 428/391
[58] Field of Search ............ 524/588; 428/391, 266

[56] References Cited

U.S. PATENT DOCUMENTS

| | | | |
|---|---|---|---|
| 3,597,268 | 8/1971 | Smith | 428/391 |
| 3,717,575 | 12/1973 | Rankin | 428/391 |
| 4,098,701 | 7/1978 | Burrill | 524/588 |
| 4,359,545 | 11/1982 | Ona et al. | 524/588 |
| 4,366,001 | 12/1982 | Ona et al. | 524/588 |
| 4,388,437 | 6/1983 | Ona | 524/588 |
| 4,436,856 | 3/1984 | Huhn et al. | 524/588 |
| 4,459,382 | 7/1984 | Ona et al. | 524/588 |
| 4,496,687 | 1/1985 | Okada | 524/859 |
| 4,536,540 | 8/1985 | Dziark | 524/701 |
| 4,541,936 | 9/1985 | Ona | 252/8.6 |
| 4,559,385 | 12/1985 | Huhn | 524/838 |
| 4,620,878 | 11/1986 | Gee | 106/287 |
| 4,631,207 | 12/1986 | Price | 524/588 |
| 4,661,551 | 4/1987 | Mayer | 524/379 |
| 4,680,366 | 7/1987 | Tanaka et al. | 524/588 |
| 4,705,704 | 10/1987 | Lane | 524/588 |

FOREIGN PATENT DOCUMENTS 0143315 10/1984 European Pat. Off. .

Primary Examiner—Veronica P. Hoke
Attorney, Agent, or Firm—George R. Dohmann; Edward McC. Roberts

[57] ABSTRACT

The present invention describes aqueous, finely divided to optically clear, thermally and mechanically stable silicone emulsions, these emulsions containing, relative to the overall emulsions 3 to 25% by weight of a water-soluble emulsifier (a), 0.1 to 84% by weight of an aminoalkyl-substituted polysiloxane (b) (amine number 0.1), in which, if appropriate, is present, at least partially, in salt form, and up to 70% by weight of which may be replaced by other polysiloxanes (emulsifier:silicone ratio at least 1.2:10), up to 3% by weight of a low-molecular weight, weak acid (c) and at least 5% by weight of water, (d), the sum of a), b), c) and d) being 100% by weight.

In addition, a process is also patented for the preparation and use of these emulsions.

The silicone emulsions according to the invention are distinguished by excellent thermal stability.

19 Claims, No Drawings

AQUEOUS, FINELY DIVIDED TO OPTICALLY CLEAR, THERMALLY AND MECHANICALLY STABLE SILICONE EMULSIONS, A PROCESS FOR THEIR PREPARATION AND THEIR USE

The present invention describes aqueous, finely divided to optically clear, thermally and mechanically stable silicone emulsions based on aminoalkyl-substituted polysiloxanes, the preparation of these emulsions, and their use.

The preparation of silicone emulsions with high-pressure emulsification has long been known (German Patent 1,060,347, U.S. Pat. Nos. 3,320,197 and 3,748,275). In addition, the preparation of polyorganosiloxane microemulsions is known from EP-OS 138,192. In this case, the starting substances, namely the polyorganosiloxane containing a polar radical and the surfactant, are mixed and added to water in order to form a translucent oil concentrate, and the concentrate obtained is then rapidly dispersed in water. This preparation of microemulsions presents considerable problems with respect to type conformity, but above all, the emulsions obtained only have an unsatisfactory thermal stability.

It has now been found that, when very certain starting compounds in selected mixing ratios are used without high-pressure homogenization, aqueous, finely divided to optically clear silicone emulsions are produced which are thermally and mechanically stable under the customary conditions and, in addition, can be prepared in a surprisingly simple fashion by stirring together silicone emulsifier and water, warming and adding acid.

Accordingly, the present invention describes, in Patent Claims 1 to 5, aqueous, finely divided to optically clear, thermally stable silicone emulsions. A process for the preparation of these silicone emulsions is patented in Patent Claims 6 to 10 and their use is patented in Patent Claim 11.

The compounds a) used are emulsifiers which are soluble in water to form a clear to transparent solution (called "water-soluble" below), in particular nitrogen-free emulsifiers. These emulsifiers are known, and those skilled in the art will have no problem in selecting the correct products. Examples which may be mentioned—without claiming comprehensiveness—are the following emulsifiers: ethylene oxide adducts of fatty alcohols, in particular those of primary and/or secondary linear to branched alcohols having 8 to 16 C atoms and ethoxylated $C_{6-12}$-alkylphenols, it being necessary to select the number of ethylene oxide units so that water solubility is produced. Compounds which are preferably used are 2,6,8-trimethyl-4-nonyloxyhexapolyethyleneoxyethanol, isotridecyl ethoxylate having an average of 8 ethylene oxide units, ethoxylated secondary dodecyl alcohol or n-decyl alcohol having an average of 12 moles of ethylene oxide, and nonylphenol polyglycol ether having an average of 10 ethylene oxide units. However, highly suitable emulsifiers are, in addition, also silicone surfactants as are produced by ethoxylation and/or propoxylation of polysiloxanes, so long as water solubility is ensured. The alkoxylation can take place as a side chain or terminally, and the chain length depends on the number of $-[Si(CH_3)_2O]_n$. Thus, for example, in polysiloxanes where $n=1$ to 5, 6 to 8 ethylene oxide units on average are present in the molecule, for example the following silicone surfactant:

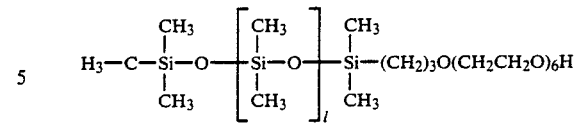

Compounds b) are aminoalkyl-substituted polysiloxanes having an amine number of at least 0.1, in particular at least 0.3, those polysiloxanes which have an amine number of 0.3 to 1.0 being very particularly preferably employed. The amine number here is defined as the consumption of 1N hydrochloric acid in millilitres per 1 g of substance (=sample weight). The compounds b) here may also be present, at least partially, in the form of salts with the compounds c).

The positioning of the aminoalkyl groups may be terminal and as a side chain. The aminoalkyl groups generally have the formula $-RNHR^1$ where R represents a divalent hydrocarbon radical having 2 to 8, in particular 3 or 4 C atoms and $R^1$=hydrogen, an alkyl radical having 1 to 4 C atoms or the $-CH_2CH_2NH_2$ radical. The amino-functional radical preferably has the following structure: $-CH_2CH_2CH_2-NH-CH_2-CH_2-NH_2$ or $-CH_2-CH(CH_3)CH_2-NH-CH_2-CH_2-NH_2$.

In addition to the aminoalkyl groups which are necessarily present, there are no particular limitations with respect to the structure of the polysiloxanes which can be used. Thus, it is possible to use straight-chain and/or branched polysiloxanes, in particular dimethyl polysiloxanes, which are substituted by aminoalkyl groups and which also contain terminal OH groups or side-chain hydrocarbon or substituted hydrocarbon radicals, in particular vinyl and/or phenyl radicals. From this description, it is easy to see that compounds b) which can be employed without hesitation are also obtained by further modification of aminoalkyl-substituted polysiloxanes, so long as the minimum amine number required is ensured by choice of the reaction ratio. The amino-functional polysiloxanes which can be employed are generally known and therefore require no further explanation.

The compounds c) are also known to those skilled in the art. Examples of acids which may be mentioned are hypophosphorous acid, nitric acid and hydrochloric acid, but in particular low-molecular weight organic acids such as lactic acid, glycolic acid, propionic acid, formic acid and, above all, for economic reasons, acetic acid.

The compounds d) are normal tap water. However, it is also possible to use distilled or demineralized water, it being advantageous here, in the case of relatively high concentrations of compound b), to convert to continuous preparation of the finished emulsions since somewhat more finely divided emulsions result by this method.

The decisive factors in the silicone emulsions according to the invention are not only the compounds employed, but also, above all, the mixing ratios of the individual compounds to one another. Thus, it is absolutely necessary that the thermally and mechanically stable silicone emulsions according to the invention contain 3 to 25% by weight of compound a), 0.1 to 84% by weight of compound b), up to 3% by weight of compound c) and at least 5% by weight of water, in each case relative to the overall emulsion, since the silicone emulsions desired are only produced if these mixing ratios are adhered to with spontaneous emulsification. Particular reliability is ensured here if the silicone emulsion contains 8 to 12% by weight of compound a), up to 1% by weight of compound c) and 5 to 70% by weight of compound d), compound d) usually being customary tap water. The sum of compounds a), b) and d) is, of course, 100% by weight.

However, in order to produce the silicone emulsions desired, it is, in addition, absolutely necessary to ensure that the emulsifier:silicone ratio (the term silicone here is taken to mean both compounds b) and the sum of compounds b) and e, compound e) being defined below)) is at least 1.2:10.

If the object is the preparation of oil-in-water emulsions, the amount of compound b) should be limited to a maximum of 70% by weight, above all 5 to 70% by weight.

Optically clear silicone emulsions (microemulsions) according to the invention are very particularly preferred. These emulsions contain up to 70% by weight, in particular up to 18% by weight, particularly preferably 12 to 18% by weight, of compounds b). The amount of acid in these optically clear silicone emulsions is particularly crucial. The customary emulsions containing 15 to 40% of compound b) (such emulsions are no longer obtained using compounds e)) contain up to 0.6% by weight, in particular 0.25 to 0.6% by weight of pure 100% acid, but the amounts may increase slightly (up to about 1% by weight) in the case of more highly concentrated silicone emulsions.

Surprisingly, very finely divided silicone emulsions are also present if up to 70% by weight of compound b) are replaced by other amino group-free polysiloxanes (compound e)). Suitable compounds e) here are more or less all polysiloxanes having another functionality. Examples which may be mentioned are: $\alpha,\omega$-diepoxy-,$\alpha,\omega$-dialkoxydimethylpolysiloxane, dimethylpolysiloxane having a vinyl, acrylate and phenoxyalkyl functionality, but also $\alpha,\omega$-dicarbinol and amide-functional organopoly-siloxanes. These silicone emulsions are less thermally stable (up to about 70° C.) compared to emulsions of compounds b) alone.

In order to prepare the silicone emulsions, the compounds a), b) and d) are initially introduced and warmed to at least 50° C. with stirring. However, it is also possible to initially introduce only compounds a) and d), to warm the mixture and only then to add compound b) with stirring, compound b) preferably always being employed in salt-free form and it being possible to replace up to 70% by weight of compound b) by compound e). The upper limit for the temperature is set only by the increase in pressure, and the mixture is preferably not warmed to more than 120° C., it naturally being necessary in this case to work in a sealed system. A temperature range from 60° to 95° C. is particularly favourable since the overall preparation proceeds sufficiently quickly in this range and it is possible to work without the use of pressure. Uniform distribution requires only a relatively short time, generally 1 to 10 minutes, usually only 1 to 5 minutes being entirely sufficient. As soon as a uniform mixture has been produced, compound c) is stirred in at the working temperature, which causes a homogeneous phase to form temporarily, i.e. the silicone emulsion desired has formed with spontaneous emulsification. A pH of 3.0 to 7.0, in particular 5.0 to 7.0 is produced by adding compound c). Taking into account the simultaneous salt formation of compounds b), the amounts which are necessary for this purpose are 0.05 to 3.05, in particular 0.1 to 1.1 and, in order to produce true microemulsions, particularly preferably 0.3 to 0.7 parts by weight of compound c) (relative to 100% acid). The amounts of compounds a), b) and d) are, corresponding to the amounts of the finished silicone emulsions, 3 to 25, in particular 8 to 12, parts by weight of compound a), 0.1 to 84, in particular 5 to 70, particularly preferably 12 to 18, parts by weight of compound b), and 5 to 96.85, above all 5 to 70, in particular 21.1 to 91.8, particularly preferably 57 to 79.9, parts by weight of compound d), the sum of compounds a), b) and d) and the amount of compound c) used for the pH adjustment being 100 parts by weight.

However it is also possible to introduce the entire amount of compound c) from the beginning, i.e. to include compound b) in salt form for the preparation of the emulsions. This procedure is likewise possible without hesitation, but a longer period of time is required in this case in order to achieve spontaneous emulsification at the elevated temperature.

For stability reasons, it should be ensured that, where necessary, acid is added after the preparation so that it remains guaranteed that the pH does not exceed 7 during storage. For stability reasons, the addition of a customary commercial biocide may also be entirely advantageous. In both cases, the addition should take place at below 40° C.

It could not have been expected from the prior art that finely divided to optically clear silicone emulsions are obtained using the compounds selected in the mixing ratios selected under the process conditions described with spontaneous emulsification, it being particularly surprising that water-clear silicone emulsions can be prepared, even at high concentration in such a simple manner. These emulsions have excellent transparency and are just as thermally stable as the finely divided silicone emulsions. Transparency here can be determined in a simple manner using a Lange turbidity photometer LTP 5, the turbidity units in accordance with the formazine standard (TU/S) permitting an expression of the emulsion quality (value for water about 0.25). However, the fact that the emulsions according to the invention, so long as they are optically clear, have a very high thermal stability, a property which has hitherto not been satisfactorily obtained by the prior art, is important and crucial here. Even if finely divided emulsions are produced, however, the latter are still very highly thermally stable (up to at least 70° C.). In addition, the emulsions prepared according to the invention also have a high mechanical stability, above all toward shaking and shear forces.

The silicone emulsions according to the invention (for processing reasons the latter are usually adjusted to 15 to 40% by weight of silicone) can be used as such for textile finishing by customary methods, namely, in particular, by the exhaust and pad-mangle methods. However, it is also possible here to simply combine these emulsions with other known textile auxiliaries—even when warm during preparation—the handle, in particular, being favourably influenced by the agents according to the invention. The textiles thus treated in a customary manner may be distinguished by a particularly smooth-surfaced, flowing soft handle.

Suitable such additives are commercially available antistatic agents, stiffening agents, synthetic resins, oil-proofing and waterproofing agents and attendant catalysts.

The invention is now illustrated in greater detail with reference to the Examples below, parts denoting parts by weight and % denoting % by weight.

EXAMPLES 1 to 4

The compounds a), b) and d) mentioned below are mixed with one another as stated, warmed to 80° C. and distributed uniformly within 2 to 3 minutes by stirring at this temperature. The stated amount of acetic acid is subsequently added at the temperature mentioned and spontaneous emulsification takes place immediately, i.e. the mixtures immediately become clear. The mixture is then allowed to cool to room temperature. In order to determine the turbidity, the microemulsions obtained are subsequently measured without solvent using a Lange turbidity photometer.

The amounts specified are parts by weight.

|  | Example 1 | Example 2 | Example 3 | Example 4 |
|---|---|---|---|---|
| Water (compound d) | 74.6 | 74.6 | 74.6 | 74.6 |
| Compound a1) |  |  | 10 | 10 |
| Compound a2) | 10 |  |  |  |
| Compound a3) |  | 10 |  |  |
| Compound b1) | 15 |  |  |  |
| Compound b2) |  | 15 |  |  |
| Compound b3) |  |  | 15 |  |
| Compound b4) |  |  |  | 15 |
| Glacial acetic acid | 0.4 | 0.4 | 0.4 | 0.4 |
| pH | 5.5 | 5.5 | 5.5 | 5.5 |
| TU/F (Turbidity units, formazine) | 6 | 6 | 8 | 50 |
| Appearance | water-clear | water-clear | water-clear | very slightly bluish |
| Thermal stability (tested at 95° C. for 2 hours) | + | + | + | + |

+ = thermally stable
− = thermally unstable
a1) = C$_{11-15}$ sec. alcohol ethoxylate having an average of 7 ethylene oxide units,
a2) = 2,6,8-trimethyl-4-nonyloxypolyethyleneoxyethanol, (®TERGITOL TMN-6 from Union Carbide Europe SA),
a3) = Isotridecyl ethoxylate with an average of 8 ethylene oxide units,
b1) = linear, trimethylsilyl-terminated dimethylpolysiloxane having —(CH$_2$)$_3$—NH—CH$_2$—CH$_2$—NH$_2$ side chains (viscosity about 1000 mPa·s at 20° C.; amine number 0.62),
b2) = linear OH-terminated dimethylpolysiloxane having —(CH$_2$)$_3$—NH—CH$_2$—CH$_2$—NH$_2$ side chains (viscosity about 1900 mPa·s at 20° C.; amine number 0.58)

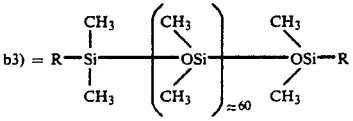

R = —(CH$_2$)$_3$—NH—CH$_2$—CH$_2$—NH$_2$ and
b4) = branched, OH-terminated dimethylpolysiloxane having —(CH$_2$)$_3$—NH—CH$_2$—CH$_2$—NH$_2$ side and terminal chains (viscosity about 1050 mPa·s at 20° C.; amine number 0.3).

If the same procedure as in Example 1 is carried out using 0.4 parts of concentrated nitric acid, a bluish emulsion is obtained (TU/F 80).

EXAMPLE 5

If Example 1 is repeated using the same amount of the silicone surfactant mentioned in the discussion of the emulsifiers, a slightly bluish, thermally extremely stable microemulsion is obtained which is insensitive towards shear stress.

EXAMPLE 6

While warming at 70° C., 8 parts of the compound a2) described in Example 1 are stirred with 16 parts of an amino-functional polysiloxane (linear, OH-terminated dimethylpolysiloxane having —(CH$_2$)$_3$—NH—CH$_2$—CH$_2$—NH$_2$ side chains; viscosity about 5000 to 6000 mPa.s at 20° C.; amine number 0.12) and 74 parts of water to form a homogeneous mixture. 1 part of lactic acid is subsequently added at the temperature mentioned and the microemulsion is produced spontaneously and becomes clear. After cooling, a clear, thermally extremely stable emulsion which is very highly suitable for softening textiles is obtained.

EXAMPLE 7

Example 2 is repeated using 20 parts of nonylphenol polyglycol ether (containing 9 ethylene oxide units per mole of nonylphenol) and 64 parts of water. A likewise water-clear microemulsion is obtained which is both cold-stable and very heat-stable and exhibits no change even after shaking for 2 hours.

EXAMPLE 8

Example 1 is repeated by adding at the beginning 0.05 part of glacial acetic acid to compound b1) and proceeding as described therein. An equally good emulsion is obtained after addition of the remaining glacial acetic acid and stirring briefly.

EXAMPLE 9

Example 1 is repeated at 95° C. (stirring time 5 to 6 minutes) using 25 parts of the following aminoalkyl-substituted polysiloxane and a correspondingly reduced amount of water: a highly branched, trimethyl-terminated dimethylpolysiloxane (amine number about 0.6; viscosity about 1200 mPa.s at 20° C.).

EXAMPLES 10 to 14

Compounds a), b), d) and e) mentioned below are mixed in the manner specified, warmed to 70° to 80° C. by stirring at this temperature for a few minutes (2 to 6 minutes depending on the viscosity of compounds b) and e) and uniformly distributed. The finished emulsion is subsequently prepared spontaneously by adding compound c). The emulsion is then allowed to cool to room temperature.

| Examples: | 10 | 11 | 12 | 13 | 14 |
|---|---|---|---|---|---|
| Water Compound d) | 48.4 | 9 | 64.6 | 34.8 | 52.7 |
| Compound a1) | — | 10 | 10 | — | — |
| Compound a2) | — | — | — | 10 | 10 |
| Compound a4) | 10 | — | — | — | — |
| Compound b1) | 40 | — | 15 | 25 | 12 |
| Compound b5) | — | 80 | — | — | — |
| Glacial acetic acid | — | — | 0.4 | 0.2 | 0.3 |
| Conc. hydrochloric acid | 1.6 | — | — | — | — |
| 57% strength glycolic acid (= compounds c) | — | 1 | — | — | — |
| Compound e1) | — | — | — | — | 25 |
| Compound e2) | — | — | — | 30 | — |
| Compound e3) | — | — | 10 | — | — |
| pH | 6.6 | 6.7 | 6.5 | 6.8 | 6.6 |
| Appearance | water clear | water clear | finely divided | finely divided | finely divided |
| Thermal stability | + | + | + | + | + |

-continued

| Examples: | 10 | 11 | 12 | 13 | 14 |
|---|---|---|---|---|---|
| (2 hours at 60° C.) | | | | | | a4) = n-dodecyl ethoxylate having an average of 6 ethylene oxide units
b5) = as the polysiloxane described in Example 6 having a viscosity of about 750 mPa · s at 20° C. and an amine number of about 0.6

$$e1) = HO-(CH_2)_3-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_8-O-\underset{\underset{CH_3}{|}}{\overset{\overset{CH_3}{|}}{Si}}-(CH_2)_3-OH$$

$$e2) = (CH_3)_3Si-\left[O\underset{\underset{CH_3}{|}}{\overset{\overset{CH_3}{|}}{Si}}\right]_n-\left[O\underset{\underset{\underset{CH_2}{\|}}{CH}}{\overset{\overset{CH_3}{|}}{Si}}\right]_n-OSi(CH_3)_3$$

Viscosity about 40 mPa · s at 20° C.; iodine number about 66.
e3) Strucutre as for e2) having a

—(CH₂)₃—O—CH₂—CH——CH₂
                    \  /
                     O side chain in place of the vinyl group
Viscosity about 50 mPa · s at 20° C.; epoxy number about 0.2.

EXAMPLE 15

72.91 parts of demineralized water,
6.66 parts of emulsifier (see Example 2, compound a3),
20.00 parts of an amino-functional polysiloxane (branched), OH-terminated dimethylpolysiloxane; viscosity about 1050 mPa.s at 20° C.; amine number 0.30) and
0.43 part of 60% strength acetic acid
are warmed to about 80° C. while stirring. After about 30 minutes at this temperature, the microemulsion has been produced while slowly becoming clear. The emulsion is now stirred until cold. A thermally stable silicone emulsion is produced.

USE EXAMPLE 1 a) Pad-mangle method

The knitted cotton fabric (200 g/m²) is pad-mangled with a liquor containing 30 g/l of the emulsion prepared according to Example 1 (liquor pH 5.5), squeezed out to a liquor take-up of about 90% and dried for 10 minutes at 110° C.

An extremely smooth-surfaced, specifically soft, flowing handle results, the fabric additionally being distinguished by high springiness and a considerable increase in the crease recovery properties.

b) Exhaust method

The microemulsion described in Example 1 is used to finish the same knitted cotton fabric by dipping the latter into a working liquor (liquor ratio 1:20), left therein for 20 minutes at 20° C. and then dried as described above. In this way 0.4% by weight of active substance is applied to the fabric by about 85% exhaustion of the liquor. Corresponding finishing effects are obtained.

USE EXAMPLE 2

In order to complete the effect, 10 to 30 g of each of the finishes mentioned below can be added to the emulsion of Example 12:
(1) about 70% strength aqueous solution of dimethyloldihydroxyethyleneurea which has been etherified using methanol,
(2) about 42% strength non-ionogenic polyvinyl acetate dispersion, or
(3) about 52% strength non-ionogenic hydrogen methyl polysiloxane dispersion.

Customary textile materials, for example also cotton poplin, cotton/synthetic mixed fabric or regenerated cellulose, can be provided with excellent overall properties in a known fashion, using these combination products.

I claim:

1. A process for preparing an aqueous, finely divided to optically clear, thermally and mechanically stable silicone emulsion containing
   (a) 3 to 25 parts by weight of an emulsifier which is soluble in water,
   (b) 0.1 to 84 parts by weight of polysiloxane said polysiloxane consisting of 30 to 100 percent by weight of aminoalkyl-substituted polysiloxane having an amine number of at least 0.1, and 0 to 70 percent by weight of amino-free polysiloxane,
   (c) 0.05 to 3.05 parts by weight of an acid,
   (d) 5 to 96.85 parts by weight of water,
   with the proviso that the parts of the emulsifier, the polysiloxane, the acid and the water add up to 100 parts by weight of the emulsion and with the further proviso that the ratio of (a) and (b) is at least 1.2:10;

said process comprising the steps of warming to at least 50° C., with stirring a mixture, containing at least the emulsifier, (a), and the water, (d), but which may also contain either the polysiloxane, (b), or both of (b) and the acid, (c), and establishing a pH of from 3 to 7 until a homogeneous phase is formed, with the proviso that if (b) and (c) or only (c) are not present in the mixture prior to warming, said process further comprises adding the missing components selected from (b) and (c) to the warm mixture, such that the mixture contains all four of (a), (b), (c), and (d).

2. A process of claim 1 wherein the emulsion contains 8 to 12 parts by weight of (a) and 0.3 to 0.7 parts by weight of (c).

3. A process of claim 1 wherein a mixture of (a), (b) and (d) is warmed and then (c) is added.

4. A process of claim 1 wherein a mixture of (a) and (d) is warmed and then (b) and (c) are added.

5. A process of one of claims 1 or 2 wherein the emulsion contains 5 to 70 parts by weight of (b).

6. A process of claim 5 wherein the emulsion contains 12 to 18 parts by weight of (b).

7. A process of claim 1 wherein (a) is selected from the group consisting of primary or secondary, linear or branched $C_8$–$C_{16}$-alkyl polyglycol ethers and $C_6$–$C_{12}$-alkylphenol ethoxylates.

8. A process of claim 1 wherein (b) contains 0 percent by weight of the amino-free polysiloxane.

9. A process of claim 1 wherein the mixture is warmed to a temperature of from 50° C. to 120° C.

10. A process of claim 9 wherein the mixture is warmed to a temperature of from 60° C. to 95° C.

11. A process of claim 1 wherein the finished emulsion has a pH of from 5.0 to 7.0.

12. A process of claim 5 wherein (a) is selected from the group consisting of primary or secondary, linear or branched $C_8$–$C_{16}$-alkyl polyglycol ethers and $C_6$–$C_{12}$-alkylphenylalkoxylates and the mixture is warmed to a temperature of from 50° to 120° C.

13. An aqueous, finely divided to optically clear, thermally and mechanically stable silicone emulsion containing
   (a) 3 to 25 parts by weight of an emulsifier which is soluble in water,
   (b) 0.1 to 84 parts by weight of polysiloxane said polysiloxane consisting of 30 to 100 percent by weight of aminoalkyl-substituted polysiloxane having an amine number of at least 0.1, and 0 to 70 percent by weight of amino-free polysiloxane,
   (c) 0.05 to 3.05 parts by weight of an acid,
   (d) 5 to 96.85 parts by weight of water,
with the proviso that the parts of the emulsifier, the polysiloxane, the acid and the water add up to 100 parts by weight of the emulsion and with the further proviso that the ratio of (a) and (b) is at least 1.2:10.

14. An emulsion of claim 13 which contains 8 to 12 parts by weight of (a), 5 to 70 parts by weight of (b) and 0.3 to 0.7 parts by weight of (c).

15. An emulsion of claim 14 which contains 12 to 18 parts by weight of (b).

16. An emulsion of claim 14 wherein (a) is selected from the group consisting of primary or secondary, linear or branched $C_8$–$C_{16}$-alkyl polyglycol ethers and $C_6$–$C_{12}$-alkylphenol ethoxylates.

17. A method of finishing textiles which comprises treating a textile with an aqueous, finely divided to optically clear, thermally and mechanically stable silicone emulsion containing
   (a) 3 to 25 parts by weight of an emulsifier which is soluble in water,
   (b) 0.1 to 84 parts by weight of polysiloxane said polysiloxane consisting of 30 to 100 percent by weight of aminoalkyl-substituted polysiloxane having an amine number of at least 0.1, and 0 to 70 percent by weight of amino-free polysiloxane,
   (c) 0.05 to 3.05 parts by weight of an acid,
   (d) 5 to 96.85 parts by weight of water,
with the proviso that the parts of the emulsifier, the polysiloxane, the acid and the water add up to 100 parts by weight of the emulsion and with the further proviso that the ratio of (a) and (b) is at least 1.2:10.

18. A method of claim 17 wherein the emulsion contains further known textile auxiliaries selected from the group consisting of biocides, anti-static agents, stiffening agents, synthetic resins, oilproofing agents, waterproofing agents and attendant catalysts.

19. A process of claim 1 wherein the acid, (c), is a low-molecular-weight organic acid.

* * * * *